(12) United States Patent
Juma

(10) Patent No.: US 7,963,402 B2
(45) Date of Patent: Jun. 21, 2011

(54) FILTER DEVICE FOR MOLTEN METAL FILTRATION AND METHOD FOR PRODUCING SUCH FILTERS

(75) Inventor: Kassim Juma, Staffordshire (GB)

(73) Assignee: Sud-Chemie Hi-Tech Ceramics Inc., Alfred Station, NY (US)

( * ) Notice: Subject to any disclaimer, the term of this patent is extended or adjusted under 35 U.S.C. 154(b) by 474 days.

(21) Appl. No.: 12/065,878

(22) PCT Filed: Sep. 4, 2006

(86) PCT No.: PCT/EP2006/008598
§ 371 (c)(1),
(2), (4) Date: Mar. 5, 2008

(87) PCT Pub. No.: WO2007/028556
PCT Pub. Date: Mar. 15, 2007

(65) Prior Publication Data
US 2009/0071293 A1    Mar. 19, 2009

(30) Foreign Application Priority Data

Sep. 5, 2005 (EP) .................................... 05108121
May 16, 2006 (EP) .................................... 06114007

(51) Int. Cl.
*B01D 39/20* (2006.01)
*C22B 9/02* (2006.01)
(52) U.S. Cl. .............. 210/508; 75/303; 75/325; 75/326; 75/327; 75/236; 210/488; 210/490; 210/503; 210/504; 210/505; 210/506; 210/509; 210/510.1; 501/80; 501/81; 501/82; 501/83

(58) Field of Classification Search .................. 210/488, 210/490, 503, 504, 505, 506, 508, 509, 510.1; 501/80, 81, 82, 83; 75/303, 325, 326, 327, 75/236
See application file for complete search history.

(56) References Cited

U.S. PATENT DOCUMENTS

| | | |
|---|---|---|
| 2,360,929 A | 10/1944 | Blaha |
| 2,752,258 A | 6/1956 | Swentzel |
| 3,947,363 A | 3/1976 | Pryor et al. |
| 4,265,659 A | 5/1981 | Blome |
| 4,528,099 A | 7/1985 | Rieger et al. |
| 5,039,340 A | 8/1991 | Hargus et al. |
| 5,520,823 A | 5/1996 | Jones et al. |

FOREIGN PATENT DOCUMENTS

| | | | |
|---|---|---|---|
| EP | 0388010 A1 | | 9/1990 |
| EP | 0159963 B1 | | 1/1992 |
| EP | 0463234 B1 | | 1/1992 |
| EP | 0251634 A2 | | 12/1993 |
| EP | 1282477 A1 | | 1/2004 |
| WO | WO 8203339 | | 10/1982 |
| WO | WO 0140414 A1 | | 6/2001 |
| WO | WO 03/020660 | * | 3/2003 |
| WO | WO 03/101584 | * | 12/2003 |
| WO | WO 03/101644 A1 | * | 12/2003 |

* cited by examiner

*Primary Examiner* — John Kim
(74) *Attorney, Agent, or Firm* — RatnerPrestia

(57) ABSTRACT

The present invention relates to a ceramic filter device for molten metal filtration comprising a major ceramic phase and a minor carbon phase bonded by phosphate bond, a method for producing such filter devices, and the use of such filter devices for the filtration of molten steel.

8 Claims, No Drawings

FILTER DEVICE FOR MOLTEN METAL FILTRATION AND METHOD FOR PRODUCING SUCH FILTERS

The present invention relates to filter devices for molten metal filtration, a method for producing such filter devices and the use of such fitter devices for the filtration of molten steel.

For the processing of molten metals it is desirable to remove exogenous intermetallic inclusions such as from impurities of the raw materials, from slag, dross and oxides which form on the surface of the melt and from small fragments of refractory materials that are used to form the chamber or vessel in which the molten metal melt is formed.

Removal of these inclusions forms a homogenous melt that insures high quality of the products especially in the casting of steel, iron and aluminum metals. Currently, ceramic filter devices are widely used due to their high ability to withstand extreme thermal shock, due to their resistance to chemical corrosion and their ability to withstand mechanical stresses.

The production of such ceramic fitter devices generally involves the mixing of ceramic powder with suitable organic binders and water in order to prepare a paste or slurry. The slurry is used to impregnate polyurethane foam, which subsequently is dried and fired at a temperature in the range of from 1000 to 1700° C. By this treatment the combustible material is burnt off during sintering to produce a porous body. U.S. Pat. No. 2,360,929 and U.S. Pat. No. 2,752,258 may serve as examples for the common procedure.

Also, an open pore filter device is known, that instead of a random distribution of irregular interconnecting passages consists of a series of parallel ducts passing through the material as generally being made by hydraulic pressing a damp ceramic powder and organic binder into a mold containing perpendicular pins. A perforated structure is thus obtained which can be in the form of a disk or block. The perforated article is then fired at a temperature in the range of from 1000 to 1700° C. depending on the final application to produce a perforated disc. During firing a ceramic and/or glassy bond is developed.

WO-A1-0140414 relates to a porous coal-based material for use in various applications such as construction, metal processing or conductors. The material is produced by heating powdered coal particulates in a mould under a non-oxidizing atmosphere. The document suggests the use of a porous coal-based product in filtering of molten aluminum metal as a replacement for the ceramic foam filters. A coal based filter is however mechanically weak.

EP A2 0 251 634 describes a process for making defined porous ceramic bodies for metal filtering purposes, having smooth walled cells formed by the pore formers, and pores with rounded edges, which interconnect the cells. The pore formers are volatilized and removed from the ceramic in the production process.

U.S. Pat. No. 5,520,823 relates to filter devices for filtering molten aluminum only. The bonding is obtained using borosilicate glass. Firing is carried out in air and a considerable amount of graphite would be lost due to oxidation by air.

Generally speaking, fitter devices used for aluminum filtration are usually fired at about 1200° C. while those intended for filtration of iron are fired at temperatures of 1450° C. and for steel at above 1600° C. Ceramic zirconia filter devices fired at approximately 1700° C. are also conventionally employed in steel filtration.

Despite their widespread use for metal filtration ceramic filter devices of the above mentioned types have several drawbacks that limit their applicability.

Ceramic filter devices, although preheated, tend to be clogged by freezing particles on the first contact with the molten metal. For this purpose usually superheated molten metal, that is metal at a temperature of about 100° C. over liquid temperature, is used for casting to prevent clogging of the filter devices. This practice is extreme wasteful in terms of energy and cost and any improvement that reduces processing temperature of the molten metal is of great benefit. Carbon coatings have been applied in the prior art on the surface of ceramic filter devices to reduce the thermal mass of the part that comes into direct contact with the molten metal.

Exothermically reacting thermite material applied to a carbon-coated surface of the ceramic filter device has been proposed by EP 0 463 234 B1. The latter solution, while reducing the temperature necessary for the flow of the molten metal, adds to the cost of production of the filter devices and very narrowly limits the applicability since the thermite coating has to be in compliance with the type of molten metal for which it is used.

Anyway, both carbon and thermite coating serve in overcoming the drawback of high thermal mass of the ceramic filter device while the challenge of several additional disadvantages is not met.

Ceramic and glassy type bonds tend to soften and creep at high temperature very often resulting in erosion of the filter device and subsequent contamination of the melt.

Cracking due to thermal shock or chemical (reductive) corrosion by the hot metal melt is a problem often encountered with ceramic and glass bonded filter devices.

The need for extremely high firing temperatures, especially in the case of ceramics intended for steel filtration, is a severe drawback of conventional ceramic filter devices which is even worse when the need for high cost ceramic raw material is considered.

In addition, the use of zirconia with its relatively strong background radiation is hazardous and should be avoided.

EP 1 421 042 A1 relates to a filter device for molten metal filtration comprising a bonded network of graphitized carbon and its use for the filtration of molten steel. However these filters are relatively weak and suffer from low mechanical strength.

EP 1 511 589 A1 relates to a filter device comprising a bonded network of graphitized carbon for molten steel filtration characterized by the presence of at least two sieve plates spaced apart from each other, in particular providing a reservoir chamber.

The filter devices according to these documents have a limited mechanical strength which causes problems during transportation and use and limit the capacity of the fitters in withstanding the pressure of molten metal on it.

Also these filter devices are friable and tend to break into bits which may fall into the mold prior to casting causing contamination of the casting.

These drawbacks have been addressed by EP 1 513 600 A1 providing a filter for metal filtration improving the mechanical strength and stiffness by employing a three dimensional network of graphitizable carbon bonding and fibers binding ceramic powder. Traditionally, fibers are added to ceramic and composite materials in order to improve mechanical strength and stiffness to the articles. Known fibers are either metal fibers, organic fibers such as polyester fibers, viscose fibers, polyethylene fibers, polyacrylonitrile (PAN) fibers, aramid fibers, polyamide fibers, etc., or ceramic fibers such as aluminosilicate fibers, alumina fibers or glass fibers, or carbon fibers; carbon fibers may consist of 100% carbon.

US-A1-4265659 relates for instance to a filter with improved strength by addition of ceramic fibers to the slurry.

Phosphate bonded alumina filters have been used in aluminum filtration. WO-A-82033339 relates to a porous ceramic filter for filtering aluminum metal. The filter is obtained by impregnation of a foam by a slurry comprising ceramic particulate preferably $Al_2O_3$, and a binder. The described binder is an aluminum phosphate binder.

U.S. Pat. No. 3,947,363 relates to an alumina based ceramic foam titer for filtering of molten metals. The binder is an aluminum orthophosphate binder.

These conventional alumina fitter devices, however, cannot be used for the filtration of e.g. iron or steel due to softness and low refractoriness of the phosphate bonding.

These drawbacks have been addressed by EP-A-159963 providing a filter that is suitable for molten steel filtration. The filter is prepared by impregnating a foam with a ceramic slip which contains a phosphate binder, squeezing off the excess slip, drying and burning the foam material at temperature of 1660° C. and higher. Thereby, the ceramic filter obtained is essentially phosphate free, ceramic particulates having mutually sintered together.

Conventional carbon filter devices are constituted by up to 50% of a carbon matrix in which ceramic powder is imbedded as described by EP 1282477 A1. This particular patent suggests controlling the firing atmosphere of the carbon bonded filters (n which air is injected at the beginning of the firing and then stopped into the firing box in order to control the level of oxygen inside the firing box. Such method is very difficult to control, tedious and liable to produce inconsistent quality of filters. Also practical experience has shown that large filters, more than 200 mm in diameter cannot be made using the methods disclosed in this patent. In addition of weak mechanical strength, size limitation and inconsistent quality, filters made according to EP1282477A1 also suffer from high oxidation rate due to the presence of high level of low oxidation resistance carbon (up to 50%). On the other hand, EP 1 421 042 A1, EP 1 511 589 A1 and EP 1 513 600 A1 disclose titers containing a graphitized bond in amounts of about 10% with up to about 90% ceramic. Despite the difference of these two types of fitters, both suffer from inconsistency in manufacturing due to the difficulty in controlling the firing atmosphere which results in variation in mechanical strength from one filter device to another and a high reject ratio as well. They also exhibit low mechanical strength causing problems in handling and transportation. These filters also suffer from low oxidation resistance, especially fitter devices containing a major carbon phase such as about 50% carbon matrix, due to the presence of their high level of oxidizable carbon. Due to high shrinkage upon firing and low mechanical strength, filters made according to EP 1282477 A 1 cannot be produced in larger sizes. The problems of low mechanical strength and friability have limited the usage of these types of fitters due to the reluctance of the foundry men to use weaker filters than ceramic bonded fitters which they are familiar with.

The object of the present invention, therefore is to address the above described problems all together, in particular to provide filter devices, and a process of producing such filter devices, being thermally and mechanically hard and strong enough to be handled without excessive care during e.g. transport, and to withstand shock and stress of casting molten metal, including iron and steel, furthermore avoiding the need of overheating the molten metals to prevent clogging of the pores, and which may be produced and reproduced reliably with predetermined properties even in large sizes.

The problems have been solved by a filter device for molten metal filtration comprising a major ceramic phase and a minor carbon phase bonded by a of phosphate bond.

Without wishing to be bound by theory it is believed that the carbon phase intertwines with and influences the build-up of the phosphate bonding network, thus fortifies its otherwise soft nature to an extent that exhibits both high hardness, structural mechanical resistance, and elasticity to withstand the challenges of the above mentioned problems. A combination of these mutually influencing structural constituents was not expected to result in the synergistic characteristics of the filter devices of the invention. It results that the filter of the invention does not need to be fired at high temperature while being also suitable for molten steel filtration. Major ceramic phase in the sense of the present invention means alumina, silica, zirconia, zircon, magnesia, graphite, mullite, silicon carbide, clay, metallic borides such as zirconium diboride, or a combination of the above in an amount of at least 50 parts by weight of the filter device.

It is essential to understand that a filter containing only a ceramic phase bonded by phosphate bond cannot be used for steel filtration due to low refractoriness of the phosphate bond. Hence it is essential to have a carbon phase which makes the filter suitable for steel filtration usage.

The phosphate bonded with minor carbon phase fitters according to the present invention exhibit a relatively low thermal mass. A result of this is that there is no need to overheat the molten metal to be filtered reducing energy consumption. The mechanical strength of a filter device according to the invention is as high as that of a purely ceramic bonded filter. The filter devices may be produced consistently with reliable high quality standards. The filter devices are easy to handle and safe during transportation. They exhibit high oxidation resistance. Due to their higher strength they can be produced in even larger size, which means they are open for further unforeseen applications in e.g. steel filtration.

Preferably, the ceramic phase of the filter device of the invention comprises or in particular consists of alumina, zirconia, zircon, silica, magnesia, any type of clay, talcum, mica, silicon, carbide, silicon nitride and the like or a mixture thereof, or graphite, in particular brown fused alumina. The filter device according to the invention is particularly preferred, wherein the phosphate constitutes up to 15 parts by weight, in particular 1 to 10 parts by weight, more specifically 5 parts by weight.

Said carbon phase preferably constitutes up to 15 parts by weight, in particular 1 to 10 parts by weight more specifically 7 parts by weight of the filter device according to the invention.

The minor carbon phase comprises or in particular consists of tar, pitch, phenolic resin, synthetic coke, semi-coke products, graphite, sintered carbon, anthracite, lignin, sintered coke products, organic polymers and a mixture or combinations thereof.

In a particularly preferred embodiment, the filter device according to the invention may furthermore contain ceramic and/or organic fibers.

Said ceramic fibers are preferably selected from the group consisting of alumina fibers, silica fibers, aluminosilicate fibers, carbon fibers and mixtures thereof. Said organic fibers are preferably selected from the group consisting of polyester fibers, polyacrylnitrile fibers, polyethylene fibers, polyamide fibers, viscose fibers, aramid fibers, and mixtures thereof.

Adding 0.1 up to 20 parts by weight, in particular 0.2 up to 10 parts by weight more particular 4 parts by weight of fibers to the filter device recipes contributes to a significant improvement in the performance of the filter devices. The improvement is mainly due to an increase of mechanical strength, improved stiffness, higher impact resistance and better thermal shock. The improvement manifests itself by an increase in filtration capacity, better mechanical integrity and less contamination to the steel casting. Due to the outstanding mechanical strength of the phosphate bonding in combination with carbon and fibers at high temperature no softening or bending can take place during the process of metal casting. This contributes to an even cleaner metal cast.

Phosphate bonded fitters further including carbon phase and fibers according to the present invention offer the following advantages compared with glassy carbon bonded filters:

High oxidation resistance
High mechanical strength
High impact resistance
Low microporosity
Low specific surface.
Structural flexibility—
Non-brittle behavior
Economical use.
Ease of manufacturing.
Consistent quality.

The inventor has found that addition of any of the types of fibers to the phosphate bonded with minor carbon phase filter devices causes a further significant improvement in the mechanical strength of the fitters as well as improvement in the impact resistance and thermal shock.

The inventor has found that the beneficial effect of the addition of fibers depends on the amount of fibers added, length of the fibers, nature and type of fiber devices added. The higher the level of fibers added the stronger the filter devices become. However, a very high level of fibers is not desirable because it has a negative effect on the rheology of the slurry. Best results are obtained from incorporating carbon fiber followed by ceramic fibers. On the other hand, carbon fibers are the most expensive while organic fibers are the cheapest. Organic fibers are the most economic to use since they are added at much lower level than either carbon or ceramic fibers (less than 2 parts by weight). However, organic fibers interfere with the rheology of the slurry more than the ceramic or the carbon fibers. The form of fibers is either chopped or bulk fibers to be added during mixing of the filter ingredients. No extra mixing technique is required.

The length of the fibers used according to the present invention, all in the range of 0.1 to 5 mm, preferably have a length from 0.1 mm to 1.0 mm.

In a further embodiment of the present invention the ceramic filter devices for molten metal filtration are produced in a first process comprising the steps of a) impregnating a foam made of thermoplastic material with a slurry containing a phosphate precursor, a carbon source, ceramic powder, optionally ceramic or carbon fibers, and optionally other additives,
b) drying, optionally followed by one or two impregnations of a slurry as described in a), followed by final drying,
c) firing the impregnated foam in non-oxidizing and/or reducing atmosphere at a temperature in the range of from 500 to 1000° C., in particular from 600° C. to 900° C.

Said phosphate precursor is preferably selected from the group consisting of phosphoric acid, sodium phosphate, ortho and mono aluminum phosphate, calcium phosphate, magnesium phosphate, phosphate containing salts, phosphate containing compounds and mixtures thereof.

Preferably a thermoplastic foam containing polyurethane is utilized for the production of filter devices according to the present invention.

It is advantageous to mix fibers if necessary and carbon source prior to impregnating the foam with ceramic powder, water, organic binder, and rheology control additives, which in one embodiment of the invention may be present in an amount of up to 2 parts by weight, preferably in a range of from 0.1 to 2 parts by weight.

In another embodiment of the present invention a second type of ceramic filter is produced by a process comprising the steps of a) pressing a semi-damp mixture comprising phosphate precursor, carbon source, ceramic powder and optionally other additives including fibers in a hydraulic press,
b) pressing the mixture in the shape of a disk or a block,
c) perforating the pressed mixture of step b) in combined or separate steps,
d) firing the perforated article of step c) in non-oxidizing and/or reducing atmosphere at a temperature in the range of from 500° C. to 1000° C., in particular from 600° C. to 900° C.

The source of the carbon, phase, is preferably a high melting pitch (HMP) because it offers optimal properties with respect to workability, cost and product quality. However, it must be noted that other carbon source can also be used to produce carbon source materials according to the present invention, such as synthetic or natural resins, graphite, coke, polymers, and sinterable carbon as long as it gives a carbon phase. The choice of carbon phase is determined by its health and safety aspects, the level of volatiles during firing, carbon yield, compatibility with other constituents, water compatibility, cost, etc. It is preferable to select a carbon source that gives high carbon yield, has low water absorption, free from environment pollution, safe to handle and use, low cost, and water compatible.

In further embodiments of the present invention these processes use a slurry (for the production of a phosphate bonded with carbon phase filter of the first type) or a semi-damp mixture (for the production of the phosphate bonded with carbon phase ceramic filter of the second type) that comprises:

phosphate precursor in the amount of 1 to 15 parts by weight
carbon phase source in the amount of 5 to 90 parts by weight
ceramic, in particular alumina powder in the amount of 5 to 90 parts by weight,
anti-oxidation material in the amount of 0 to 80 part by weight
fibers in the amount of 0 to 20 parts by weight,
organic binder in the amount of from 0 to 10, in particular 0.2 to 2 parts by weight and,
dispersion agent in the amount of from 0 to 4, in particular 0.1 to 2 parts by weight.

Water is added in a quantity as required. For the purpose of slurry-preparation, 15 parts 40 by weight of water are necessary depending on the nature of the ceramic filler materials and the source of carbon phase. For the semi-damp mixture used for pressing, water is necessary in an amount of from 2 to 10 parts by weight depending of the nature of the ceramic filler materials and the source of carbon phase.

The ceramic powder may comprise or preferably consists of alumina, particularly brown fused alumina, zirconia, zircon, silica, magnesia, any type of clay, talcum, mica, silicon, carbide, silicon nitride and the like or a mixture thereof.

Preferred anti-oxidation materials according to the present invention are metallic powder such as steel, iron, bronze, silicon, magnesium, aluminum, boron, zirconium boride, calcium boride, titanium boride and the like, and/or glass frits containing 20 to 30 parts by weight by weight of boric oxide.

Organic binders that are preferred according to the present invention are green binders such as polyvinyl alcohol (PVA), starch, gum arabic, sugar or the like or any combination thereof. These binders may be added to improve the mechanical properties of the fitter devices during handling prior to firing. Starch and gum arabic may also be used as thickening agent.

Preferred dispersion agents according to the present invention are Despex®, ligninsulphonate or the like, or any combination thereof which help to reduce the water level in the slurry and improve the rheology.

In a further embodiment of the present invention the slurry or semi-damp mixture may comprise a plasticizer such as polyethylene glycol (preferred molecular weight 500 to 10000) in the range of from 0 to 2 parts by weight preferably 0.5 to 1 part by weight and/or an anti-foam agent such as silicon anti-foam in the range of from 0 to 1 part by weight preferably 0.1 to 0.5 parts by weight.

The filter of the present invention is also suitable for the filtration of molten steel because of its outstanding properties.

The invention is further illustrated by the following examples:

As graphitizable high matting pitch (HMP) a coal-tar pitch was used having a glass transition temperature of 210° C., a cooking value of 85%, an ash value of 0.5% being commercially available as a fine powder.

EXAMPLE 1

A: Filters According to the First Type

A polyurethane foam was cut to the required size and impregnated with a slurry comprising:

| | |
|---|---|
| Alumina powder | 88 parts by weight (ppw) |
| Aluminum phosphate | 5 ppw |
| Carbon (HMP) | 7 ppw |
| Organic binder PVA | 1.0 ppw |
| Deflaculant Despex ® | 0.2 ppw |
| Anti-foam agent Organo silicon Derivitives | 0.1 ppw |
| And water. | |

The filter was either impregnated manually or by a machine containing rollers used for this purpose. After impregnation the fitter was dried using hot air and/or a microwave drier. A further coating was applied by a spraying air gun. The filter device was dried once more and transferred to a furnace and was fired in inert atmosphere at a temperature in the range of from 600° C. to 900° C. for 20 to 120 min at a heating rate in the range of from 1° C./min to 10° C./min. Said filter device had a modulus of rupture of 1 MPa. The heavier the filter the higher is the strength. This filter device was significantly lighter than those made from only ceramic or glass bonded material. It was also significantly cheaper. During field trials it was found that no superheat is required when using this filter since extra heat was generated upon contact of molten metal with the filter device (exothermic reaction).

EXAMPLE 2

A filters according to example 1 was prepared with a slurry comprising:

| | |
|---|---|
| Alumina powder | 84 parts by weight (ppw) |
| Aluminum phosphate | 5 ppw |
| Carbon (HMP) | 7 ppw |
| Organic binder PVA | 1.0 ppw |
| Deflaculant Despex ® | 0.2 ppw |
| Anti-foam agent Organo silicon Derivatives | 0.1 ppw |
| Carbon fibers | 4 ppw |
| And water. | |

Said filter device had an increased modulus of rupture with respect to the filter of the example 1. A modulus of rupture greater than 3 MPa has been measured. During field trials it was found that no superheat is required when using this filter since extra heat was generated upon contact of molten metal with the filter device (exothermic reaction). Depending on the fiber content, modulus of rupture up to 6 MPa can be measured.

EXAMPLE 3

B: Filter According to the Second Type

A mixture according to Example 1 comprising 4 ppw of water was prepared in a Hobart or Eirich mixer. The aim of the mixing process was to make a semi-damp and homogenous mixture. The mixture was aged for 24 hours prior to pressing. A predetermined weight of the mixture was placed in a steel mold containing vertical pins as is described in EP 1 511 589 A1. Pressing the mix produced a perforated article. This perforated article was then removed form the mold, dried and fired in a non-oxidizing or reducing atmosphere at a temperature of 900° C. for 1 h with a heating rate of 2° C./min.

I claim:

1. A filter device for molten metal filtration comprising a major ceramic phase in an amount of at least 50 parts by weight and a minor carbon phase in an amount of 1 to 15 parts by weight bonded by phosphate bond in an amount of 1 to 15 parts by weight.

2. The filter device of claim 1, wherein the ceramic phase comprises a material selected from the group consisting of alumina, zirconia, zircon, silica, magnesia, any type of clay, talcum, mica, silicon, carbide, silicon nitride and a mixture thereof.

3. The filter device of claim 1, wherein the ceramic phase comprises brown fused alumina.

4. The filter device of claim 1 further comprising fibers selected from the group consisting of ceramic fibers and organic fibers.

5. The filter device of claim 4, comprising ceramic fibers, wherein said ceramic fibers are selected from the group consisting of alumina fibers, silica fibers, aluminosilicate fibers, carbon fibers and mixtures thereof.

6. The filter device of claim 4, comprising organic fibers, wherein the organic fibers are selected from the group consisting of polyester fibers, polyacrylnitrile fibers, polyethylene fibers, polyamide fibers, viscose fibers, aramid fibers, and mixtures thereof.

7. The filter device of claim 4, comprising an amount of 0.1 to 20 parts by weight of said fibers.

8. The filter device of claim 4, wherein the length of the fibers is in the range of 0.1 mm to 5 mm.

* * * * *